C. H. GILL.
LINE STOP MECHANISM FOR TYPE WRITERS.
APPLICATION FILED SEPT. 12, 1910.

996,638.

Patented July 4, 1911.

3 SHEETS—SHEET 2.

Witnesses:
H. R. L. White
R. A. White

Inventor
Charles H. Gill,
By Kummler & Kummler
Attys

C. H. GILL.
LINE STOP MECHANISM FOR TYPE WRITERS.
APPLICATION FILED SEPT. 12, 1910.
996,638.
Patented July 4, 1911.
3 SHEETS—SHEET 3.
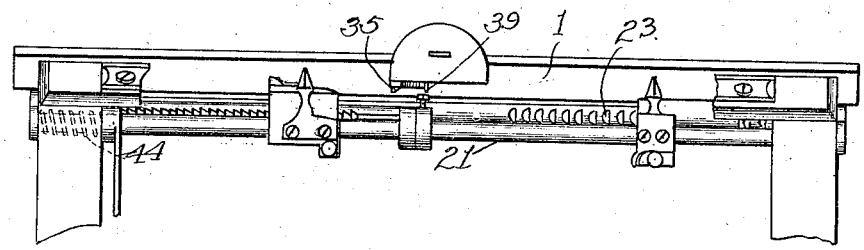
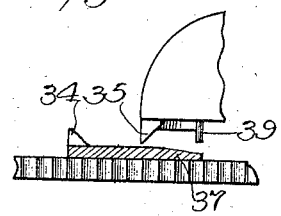
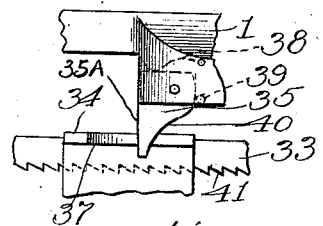
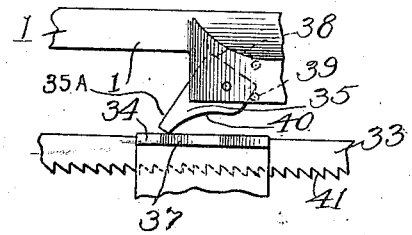
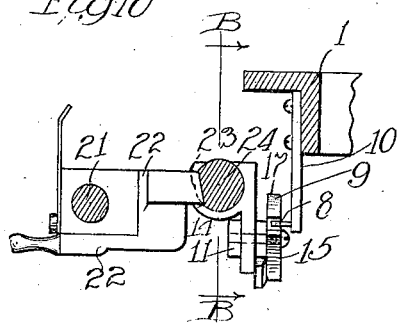
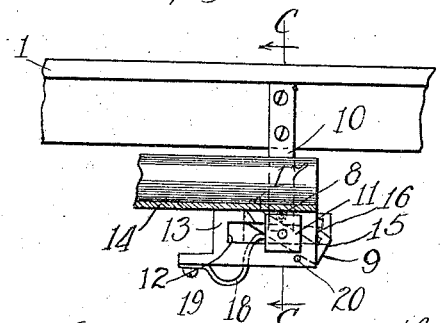
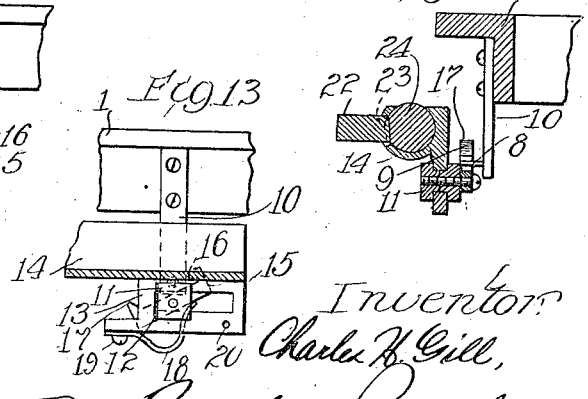
Witnesses:
H. R. L. White
R. A. White
Inventor:
Charles H. Gill,
By Rummler & Rummler Attys

UNITED STATES PATENT OFFICE.

CHARLES H. GILL, OF CHICAGO, ILLINOIS, ASSIGNOR TO THE MONARCH TYPEWRITER COMPANY, OF SYRACUSE, NEW YORK, A CORPORATION OF NEW YORK.

LINE-STOP MECHANISM FOR TYPE-WRITERS.

996,638.     Specification of Letters Patent.     Patented July 4, 1911.

Application filed September 12, 1910. Serial No. 581,562.

*To all whom it may concern:*

Be it known that I, CHARLES H. GILL, a citizen of the United States of America, and a resident of Chicago, county of Cook, State of Illinois, have invented certain new and useful Improvements in Line-Stop Mechanisms for Type-Writers, of which the following is a specification.

The main objects of this invention are to provide an improved form of line stop mechanism for limiting the travel of the carriages of typewriting machines; to provide improved mechanism for limiting the return of the typewriter carriage to the right, for determining the width of the normal lefthand margin on the paper written upon; to provide means for automatically releasing the stop mechanism when the pressure which caused the return of the carriage is relieved, so that a mere repetition of such pressure will be sufficient cause for further movement of the carriage; to provide improved means for resetting said stop mechanism when the carriage moves in the opposite direction; to provide improved line stop mechanism for determining the righthand margin on the paper written upon and adapted to be released automatically by the normal operation of the type keys, without the use of special margin release keys.

To the above and other ends which will hereinafter appear, my invention consists in the features of construction, arrangements of parts and combinations of devices to be set forth in the following specification and pointed out in the appended claims An illustrative embodiment of this invention is shown in the accompanyng drawings, in which:—

Figure 1:
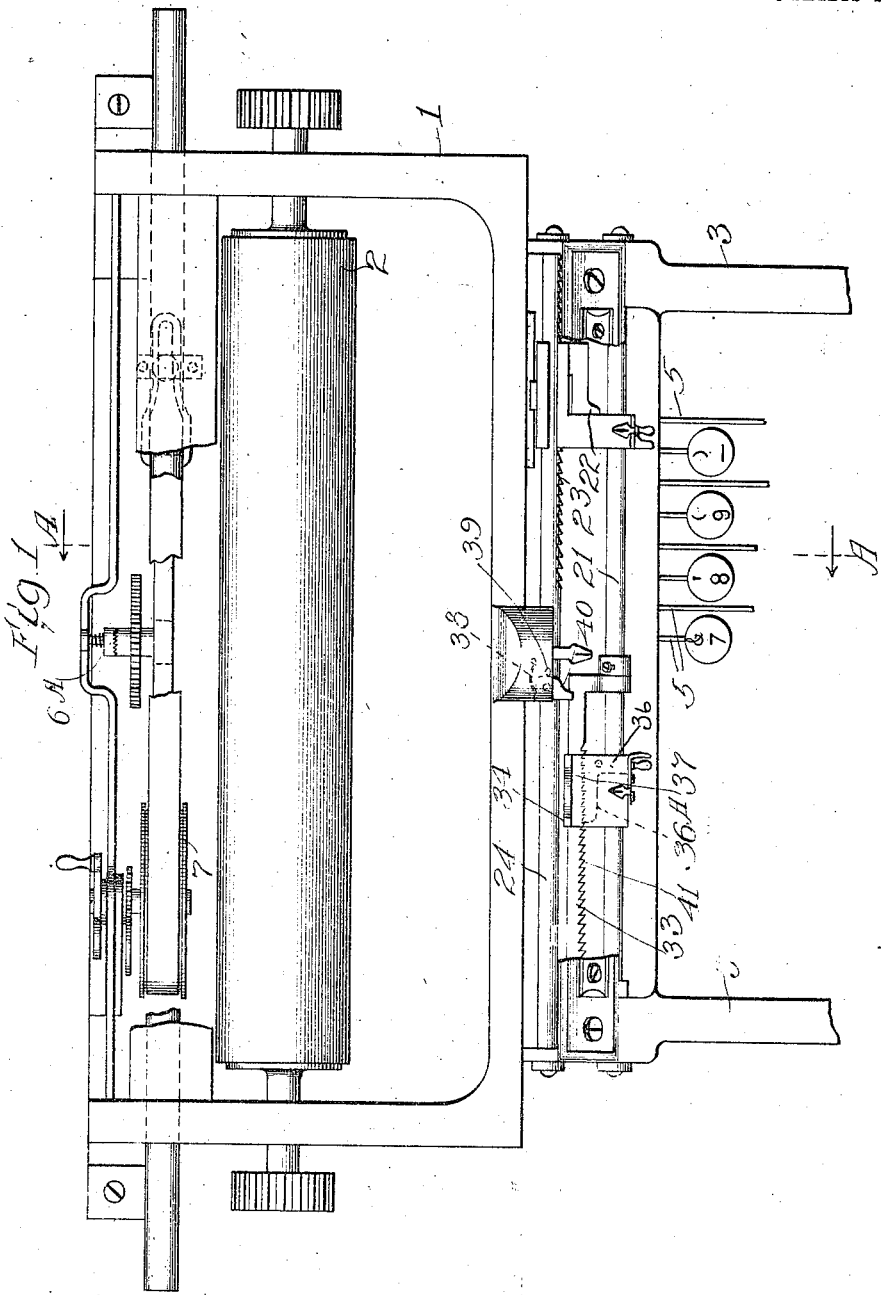
Figure 2:
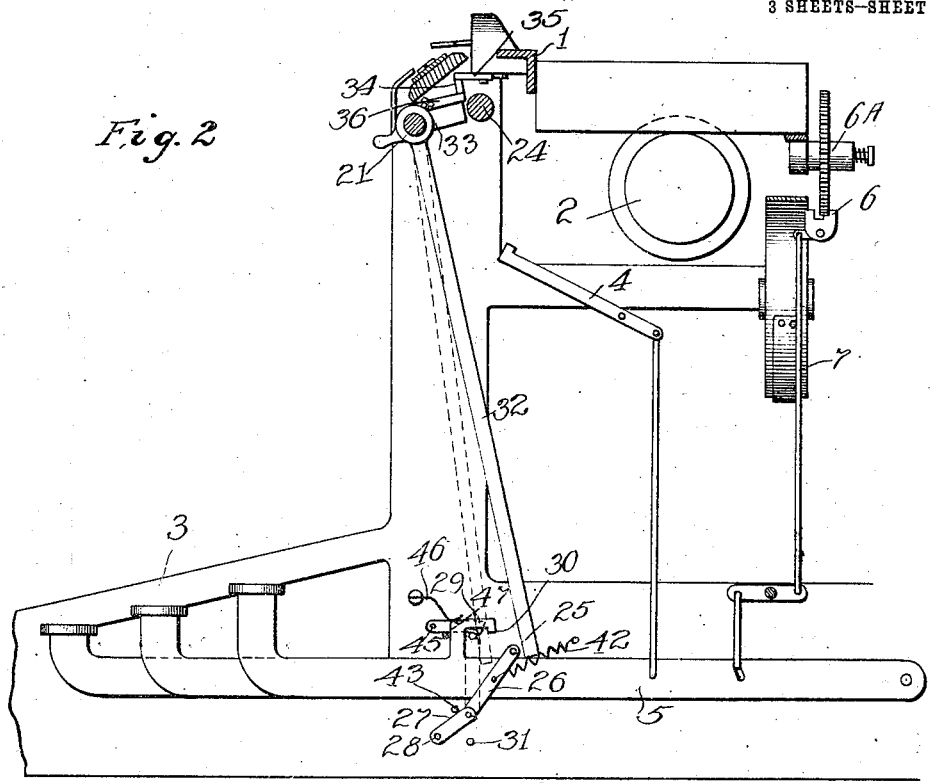
Figure 3:
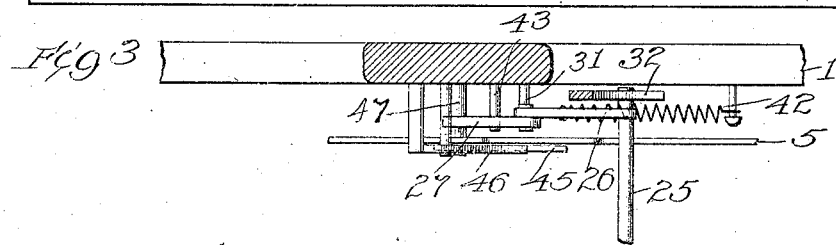
Figure 4:
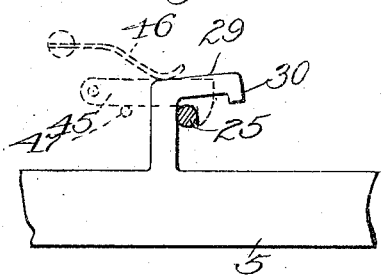
Figure 5:
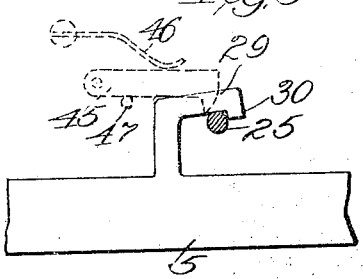

Figure 1 is a fragmentary top plan of a typewriter equipped with a specific form of line stop mechanism constructed according to this invention. Fig. 2 is a sectional elevation, taken on the line A—A of Fig. 1, and showing the lefthand line stop mechanism. Fig. 3 is an enlarged fragmentary detail in plan illustrating the method of mounting the key lever locking bar of the righthand margin stop mechanism. Figs. 4 and 5 are enlarged fragmentary details, illustrating different positions of the locking bar with respect to the key levers. Fig. 6 is a fragmentary front elevation corresponding to Fig. 1. Figs. 7 and 8 are enlarged fragmentary details, respectively in plan and elevation of some of the coacting parts of the righthand margin stop mechanism. Fig. 9 is a plan view of the parts shown in Figs. 7 and 8, illustrating how one of the stops retracts to avoid conflict with the other when the carriage is returned to its starting position. Fig. 10 is an enlarged detail, partly sectional, illustrating the arrangement of the left margin stop mechanism which limits the movement of the carriage to the right. Fig. 11 is an enlarged front view of the same, as viewed from the plane of the line B—B of Fig. 10, showing the stop retracted, and the shoulder on the carriage in such position that a further movement of the carriage to the left will cause it to reset the stop. Fig. 12 is a sectional detail of the parts shown in Fig. 11, the section being taken on the line C—C of Fig. 11. Fig. 13 is a view showing the stop reset, so as to engage the shoulder on the frame.

The typewriting machine shown in the drawings is of usual form, but the carriage escapement mechanism is shown somewhat diagrammatically, in order to simplify the drawings, and the marginal stops are so designed as to require but a light modification of usual typewriter construction. The lefthand margin stop mechanism comprises coacting parts on the carriage and the frame, which limit the return movement of the carriage at its normal margin, but after having stopped the carriage, permit its movement to be continued. The righthand margin stop mechanism comprises a member adapted to enter into interlocking engagement with the type key levers by engagement of coacting parts carried by the carriage and the frame, and adapted to be released from such interlocking engagement through the normal operation of the type keys.

In the construction shown in the drawings, the carriage 1, on which the platen roller 2 is journaled, is mounted to travel back and forth on the frame 3 in the usual manner. A plurality of type bars 4 are mounted in the frame 3 in the usual manner, and connected to their respective type key levers 5, which are arranged to operate the usual escapement mechanism 6, for causing a step by step advancement of the carriage as it is urged in the lefthand direction by the spring drum mechanism 7. The clutch mechanism 6ᴀ permits the free movement of the carriage in the righthand direction. These parts of the machine are shown in the drawings somewhat diagrammatically, as their specific construction forms no part of the present invention.

The margin stop mechanism which limits the return movement of the carriage to the right to determine the left-hand margin on the paper comprises a pin, stop or shoulder 8 fixed on the carriage and a pivoted stop 9. The shoulder 8 is carried by a depending arm 10 fixed on the carriage 1, and the stop 9 is pivotally mounted on a block 11, which in turn is horizontally slidable in a slot 12 formed in the depending flange 13 on the member 14. The righthand end of the stop 9 has a part 15 terminating in a lug 16, which coacts with the shoulder 8 to prevent the complete retraction of the stop 9 until the carriage is moved so as to shift the shoulder 8 out of engagement therewith. The opposite end of the stop 9 has an inclined part 17, with which the shoulder coacts to reset the stop 9. A spring 18 is attached to the flange 13 and normally arranged to bear on the stop 9 at a point about midway between the limits of movement of the block 11 in the slot 12, and thus acts to tip the stop 9 in either direction, according to the position of the block 11 in the slot 12. Pins 19 and 20 are positioned on the flange 13 to limit the action of the spring 18 upon the stop 9. The member 14 is slidably mounted on the rod 21, which extends across the front part of the frame 3, parallel with the travel of the carriage 1, and has a detent 22 pivoted thereto, the outer end of which engages the notches 23 in the rod 24, so that the line stop mechanism can be set to arrest the movement of the carriage at any desired point.

The righthand margin line stop mechanism limits the movement of the carriage to the left and comprises a rod 25 extending across the typewriter above the key levers 5, and carried by arms 26, which are pivotally connected to links 27, pivoted on the stud shafts 28. The rod 25 is adapted to be shifted forwardly under the upstanding hooks 29, integrally formed on the key levers 5 and terminating in the shoulder 30, so that when a key lever is depressed, the rod 25 is urged downwardly until the links 27 abut against the pins 31.

The shifting mechanism for moving the rod into position to engage the hooks 29 comprises a lever 32, carried by a bar 33 mounted on the rod 21, which is adapted to be swung forwardly by the engagement of the shoulder 34 and the stop 35. The shoulder 34 is formed on the member 36, and has an inclined face 37 which constitutes a cam with which the stop 35 coöperates. The stop 35 is pivotally mounted on the carriage 1, and normally urged by the spring 38 into the path of the stop 34, the action of which spring is limited by the pin 39. The under face of the stop 35 is tapered to form the narrow shoulder 35ᴬ so that it will engage the shoulder 34 during only a part of the movement of the carriage through one space, and the tapered part tends to shift the stop 35 slightly on its pivot to insure the return of the lever 32 to its normal position without further movement of the carriage. The stop 35 also has an inclined face 40, which coacts with the vertical face of the shoulder 34, so as to swing the stop 35 out of the path of the shoulder 34 as the carriage 1 is returned to its starting position. The member 36 may be shifted along to rod 21 so that the shoulders 34 and 35ᴬ will enter into engagement for operating the line stop mechanism at any desired point, and the member 36 may be locked in that position by the engagement of the usual detent 36ᴬ with the teeth 41 on the bar 33. The rod 25 is normally urged out of position for engagement with the hooks 39 by means of springs 42, connected to the frame 3 and to the arms 26, and pins 43 limit the action of the springs 42, so as to insure the proper breaking of the joint between the arms 26 and links 27. A spring 44 normally urges the bar 33 so as to bring the shoulder 34 into position to engage with the stop 35.

The contact of the shoulders 34 and 35ᴬ is only long enough to insure that the rod 25 will be shifted forwardly under the hooks 29, where it is held in such position by the latch or detent 45, which is normally urged by the spring 46 into position to engage the rod 25, which detent is limited in its downward movement by the pin 47.

The operation of the line stop mechanisms is as follows:—Through the normal operation of the type keys, the carriage is caused to advance to the left until the stop 35 engages with the shoulder 34, whereupon the lever 32 is shifted toward the front of the machine, so as to bring the rod 25 under the hooks 29 on the key levers, where it is retained by the detent 45 (Fig. 4). The operation of the key lever just before the type keys are locked, releases the carriage in the usual way, and causes it to be advanced one space. During this movement, the shoulders 34 and 35ᴬ pass into and out of engagement, and allow the spring 44 to return the lever 32 to its normal position. When the operator strikes the next key lever 5, its hook 29 engages the bar 25, and its stroke is shortened, being limited by the abutting of the link 27 against the pin 31. This locks the carriage by preventing sufficient movement of the key levers to operate the escapement, and serves as a signal to the operator that the normal margin for which the member 36 was set has been reached. As the key lever moves down, it carries the rod 25 out of engagement with the detent 45, and the springs 42 urge it rearwardly, but it is prevented from escaping from the hooks through contact with the shoulder 30 (Fig. 5). The release of the key lever lifts the hook 29, and permits the springs 42 to urge the rod 25 to its normal position, after which the key levers can then be given their full stroke, and the writing operation continued until the carriage reaches the extreme limit of its travel. It is thus seen that the line stop is withdrawn automatically, and all that the operator needs to do to continue the writing beyond the margin is to again strike the key lever which signaled the arrival of the carriage at the margin and release the locking mechanism. When the writing of a line has been completed, the operator pushes the carriage to the right, in the usual way, until stopped by the lefthand margin stop. This movement is limited by the shifting of the block 11 to the righthand limit of its movement, through the engagement of the shoulder 8 with the stop 9. When the stop 9 is so shifted, the spring 18, bearing upon the stop at a point at the left of its pivot, forces the righthand end down. The shoulder 16 abuts against the shoulder 8, and prevents the parts from passing out of engagement until the pressure on the carriage is relieved, which allows it to move slightly to the left, due to clutch member 6$^A$ slipping into interlocking engagement, whereupon the shoulder 8 recedes from the shoulder 16 on the stop 9, and the stop swings down against the pin 20. The carriage is then in position to begin the writing operation at the normal margin, unless the operator desires to write to the left of the margin. To do this, it is only necessary to push the carriage farther to the right after once releasing it. As the carriage thereafter travels to the left during the normal operation of the type keys, the stop 8 again engages with the stop 9, and coacts with the inclined face 17 at the left end thereof, so as to shift the block 11 to the opposite limit of its movement, whereupon the spring 18 swings the righthand end of the stop upwardly into position to again engage with the stop 8, when the carriage is returned to the starting point.

Although but one specific embodiment of this invention is herein shown and described, it will be understood that numerous details of the construction shown may be altered or omitted without departing from the spirit of this invention as defined by the following claims.

I claim:—

1. In a typewriting machine, the combination of a frame, a carriage mounted to travel back and forth thereon, a stop on said carriage, a stop on said frame located to engage said carriage stop to limit the movement of said carriage in one direction, and means automatically actuated through the engagement of said stops for retracting one of said stops to allow a further movement of said carriage.

2. In a typewriting machine, the combination of a frame, a carriage mounted to travel back and forth thereon, a stop on said carriage, a stop on said frame located to engage said carriage stop to limit the movement of said carriage in one direction, means automatically actuated through the engagement of said stops for retracting one of said stops to allow a further movement of said carriage, and means for resetting said stop through a return movement of the carriage.

3. In a typewriting machine, the combination of a frame, a carriage mounted to travel back and forth thereon, a shoulder on said carriage, a stop shiftably mounted on said frame and adapted through engagement with said shoulder to be shifted thereby to a position wherein it will stop the movement of said carriage, and means actuated through the shifting of said stop for automatically retracting it after it has stopped the carriage, and thereby allowing a further movement of the carriage in the same direction.

4. In a typewriting machine, the combination of a frame, a carriage mounted to travel back and forth thereon, a part mounted to move between limits on said frame, a stop pivotally mounted on said part, resilient means engaging said stop and adapted to urge it in opposite directions when said part is shifted to opposite limits of its travel, a shoulder on said carriage adapted to coact with said stop for shifting the same to one limit of its movement for limiting the movement of said carriage and permitting said resilient means to retract said stop so as to allow a further movement of said carriage.

5. In a typewriting machine, the combination of a frame, a carriage mounted to travel back and forth thereon, a part shiftably mounted on said frame, a stop pivotally mounted on said part, a spring bearing on said stop at a point intermediate of the limit of travel of said part, for urging said stop in respectively opposite directions, a shoulder on said carriage adapted to coact with said first stop for shifting the same to a position for limiting the movement of said carriage in one direction and permitting said spring to retract said stop to allow a further movement of said carriage, said shoulder being adapted to reset said stop when said carriage travels in the opposite direction.

6. In a typewriting machine, the combination of a frame, a carriage mounted to travel back and forth thereon, a shoulder on said carriage, a stop pivotally mounted on said frame and adapted to coact with said shoulder for limiting the movement of said carriage in one direction, means for retracting said stop after engagement with said shoulder to allow a further movement of said carriage, and an inclined surface on said stop adapted to coact with said shoulder for resetting said stop when said carriage moves in the opposite direction.

7. In a typewriting machine, the combination of a frame, a carriage mounted to travel back and forth thereon, a plurality of type bars, type key levers operatively connected to said type bars, mechanism for advancing said carriage in one direction by the operation of said type key levers, a hook on each of said said type key levers, a member shiftably mounted on said frame and normally urged out of the path of said hooks, a lever mechanism adapted to shift said member into the path of said hooks, coacting shoulders on said lever mechanism and said carriage, adapted to actuate said lever mechanism when said carriage reaches a predetermined point in its travel, and a detent adapted to hold said member in the path of said hooks for limiting the stroke of said levers, said detent being arranged to be released from said member when one of said levers is depressed.

8. In a typewriting machine, the combination of a frame, a carriage mounted to travel back and forth thereon, a plurality of type bars, type key levers operatively connected to said type bars, mechanism for advancing said carriage in one direction by the operation of said type key levers, a hook on each of said type key levers, a member shiftably mounted on said frame and normally urged out of the path of said hooks, a lever mechanism adapted to shift said member into the path of said hooks, coacting shoulders on said lever mechanism and said carriage, adapted to actuate said lever mechanism when said carriage reaches a predetermined point in its travel, a detent adapted to hold said member in the path of said hooks for limiting the stroke of said levers, said detent being arranged to be released from said member when one of said levers is depressed, and a shoulder on each of said hooks adapted to engage said member after its release from said detent to prevent the disengagement of said member and hook until said type key lever assumes its normal position.

9. In a typewriting machine, the combination of a carriage; and margin stop mechanism operative to arrest the carriage at the same predetermined point each time said carriage is returned to begin a new line of writing, said margin stop mechanism including automatically operating means for rendering said margin stop mechanism ineffective to arrest the carriage at said predetermined point when the pressure which caused said return movement is relieved, thus enabling a further movement of the carriage beyond said predetermined point to be effected by a mere renewal of such pressure.

10. In a typewriting machine, the combination of a carriage; and margin stop mechanism normally operative to arrest the carriage at the same predetermined point each time it is returned to begin a new line of writing, said margin stop mechanism including automatically operating means for affording a return movement of the carriage beyond said predetermined point when desired and for automatically reëstablishing a normal relation between the parts of the margin stop mechanism by a movement of the carriage in the opposite direction so that said mechanism is effective to arrest the carriage at said predetermined point at the next return movement of the carriage to begin a new line.

11. In a typewriting machine, the combination of a carriage, and margin stop mechanism normally operative to arrest the carriage at the same predetermined point each time it is returned to begin a new line of writing, said margin stop mechanism including automatically operating means effective to first arrest the carriage at said predetermined point and then afford a continued movement of the carriage beyond said predetermined point if desired and to automatically reëstablish a normal relation between the parts by a movement of the carriage in the direction of its step-by-step feed so that said mechanism is effective to again arrest the carriage at said predetermined point at the next return movement of the carriage.

12. In a typewriting machine, the combination of a traveling carriage, means for arresting said carriage at a given normal marginal point on each of its return movements to begin a new line, means acting automatically each time the carriage is arrested by said arresting means to throw said arresting means out of operation so that, by a mere renewal of pressure on the carriage, said carriage can be moved beyond its normal marginal position, and means, acting automatically at each operation of the above recited means, to restore said arresting means to its normal operative condition.

13. In a typewriting machine, the combination of a carriage, means for arresting the return of the carriage at the same point each time, and means for automatically releasing the said arresting means when the pressure which caused the return of the carriage is relieved, thus enabling a further movement of the carriage by a mere renewal of such pressure.

Signed at Chicago this 3rd day of September 1910.

CHARLES H. GILL.

Witnesses:
 EUGENE A. RUMMLER,
 MARY M. DILLMAN.